US 6,702,032 B1

(12) United States Patent
Torras, Sr.

(10) Patent No.: US 6,702,032 B1
(45) Date of Patent: *Mar. 9, 2004

(54) METHOD AND APPARATUS FOR CONTAINING GROUND FIRES

(76) Inventor: Robert M. Torras, Sr., 101 Gould St., St. Simons Island, GA (US) 31522

( * ) Notice: Subject to any disclaimer, the term of this patent is extended or adjusted under 35 U.S.C. 154(b) by 206 days.

This patent is subject to a terminal disclaimer.

(21) Appl. No.: 09/702,471

(22) Filed: Oct. 31, 2000

Related U.S. Application Data

(63) Continuation-in-part of application No. 09/053,267, filed on Apr. 1, 1998, now Pat. No. 6,138,444.

(51) Int. Cl.$^7$ ................................................. A62C 8/00
(52) U.S. Cl. ............................ 169/48; 169/45; 169/54; 56/6; 56/14.7; 56/14.2
(58) Field of Search ........................... 169/48, 49, 45, 169/54, 50; 56/6, 16.4, 13.6, 14.7, 14.2

(56) References Cited

U.S. PATENT DOCUMENTS

| | | | |
|---|---|---|---|
| 1,663,250 A | | 3/1928 | Graham |
| 3,154,903 A | | 11/1964 | Smith ........................ 56/25.4 |
| 3,375,645 A | | 4/1968 | Miller ........................ 56/25.4 |
| 3,469,376 A | * | 9/1969 | Bacon ............................. 56/6 |
| 3,720,048 A | * | 3/1973 | Grubb et al. ................. 56/15.9 |
| 3,805,766 A | * | 4/1974 | Hammon .................. 126/271.2 |
| 4,313,295 A | | 2/1982 | Hansen et al. ............... 56/15.8 |
| 4,325,211 A | | 4/1982 | Witt et al. ................... 56/15.8 |
| 4,876,846 A | | 10/1989 | Torras ......................... 56/11.9 |
| 4,926,621 A | | 5/1990 | Torras ............................. 56/6 |
| 5,214,867 A | * | 6/1993 | Weatherly et al. ............. 37/357 |
| 5,237,804 A | | 8/1993 | Bertling ......................... 56/60 |
| 5,321,938 A | | 6/1994 | LeBlanc .......................... 56/6 |
| 5,435,117 A | | 7/1995 | Eggena ........................ 56/10.2 |
| 5,626,194 A | * | 5/1997 | White ......................... 169/54 |
| 5,642,765 A | * | 7/1997 | Brown ........................ 56/294 |
| 6,038,840 A | * | 3/2000 | Ishimori et al. ............. 56/13.3 |
| 6,065,274 A | * | 5/2000 | Laskowski et al. .......... 56/11.6 |
| 6,138,444 A | * | 10/2000 | Torras, Sr. ....................... 56/6 |

FOREIGN PATENT DOCUMENTS

| | | | |
|---|---|---|---|
| EP | WO 97/15352 | * | 5/1997 |
| FR | 2612075 | * | 9/1988 |

* cited by examiner

Primary Examiner—Dinh Q. Nguyen
(74) Attorney, Agent, or Firm—Thomas, Kayden, Horstemeyer & Risley

(57) ABSTRACT

Ground fires are contained by an apparatus such as a brush cutter that creates a fuelbreak. The brush cutter (10) includes a rearwardly positioned tractor (11) and a forwardly positioned cutter assembly (12) for cutting fuelbreaks through brush. The brush cutter renders cut brush into smaller pieces that lay substantially on the ground after cutting and that smolder when ignited while lying on the ground. Outboard rectilinear cutting blades (49 and 51) rotate in their forward arcs toward each other so as to urge the cut brush inwardly toward the adjacent blades for re-cutting. The leading skirt (31) of the cutter deck (30) engages and bends the taller brush in the direction of movement of the brush cutter before the lower portions of the brush are cut, thereby inducing the brush to fall in the path of the brush cutter, so that it is overrun by the brush cutter and chopped. The chopped brush is disposed along the path of cut brush, thereby providing a pathway through the uncut vegetation.

11 Claims, 7 Drawing Sheets

METHOD AND APPARATUS FOR CONTAINING GROUND FIRES

CROSS REFERENCE

This is a continuation-in-part of application Ser. No. 09/053,267, filed Apr. 1, 1998, now U.S. Pat. No. 6,138,444.

FIELD OF THE INVENTION

This invention relates to a method and apparatus for cutting and chopping brush and of containing ground fires.

BACKGROUND OF THE INVENTION

Ground fires consume millions of acres of wilderness annually. In 1999, the National Interagency Fire Center reported that over five million acres of land were burnt and that the federal government spent over a half billion dollars to suppress wilderness fires. In 2000, over 6.3 million acres of wilderness h have been burnt and the U.S. Congress has budgeted 638 million dollars to cover the direct cost incurred suppressing and ground fires, and the total cost is expected to exceed 1 billion dollars in 2000.

Typically, brush, which includes bushes, vines, small trees and other low to midheight vegetation, is the fuel source of ground fires. Large trees usually are resistant to low lying ground fires, provided the ground fire is not hot enough to ignite the canopy of the large tree. When the ground vegetation is dry, as frequently happens during the summer months, ground fires are capable of burning extremely hot and fast.

Firebreaks are generally made by either ground crews using axes, hoes, and other equipment, to manually remove brush, or by mechanical means such as a tractor or a bulldozer. When a tractor is used to create a firebreak, the tractor pulls a plow through the brush and the ground in which the brush is growing, and the surface earth and the brush are turned over so that the brush becomes substantially covered by a layer of dirt. Thus, when a ground fire reaches the firebreak, the combustible material, the foliage of the brush, is essentially buried and the fire is contained by the firebreak. Bulldozers are used in a similar manner to create firebreaks. A bulldozer with an attached blade uses the blade to simply scrape away a portion of the topsoil and the brush growing in the ground as the bulldozer moves forward. In its wake, the bulldozer leaves a strip of land devoid of brush, so that a ground fire is contained by the firebreak.

While firebreaks are generally effective in containing ground fires there are problems associated with them. For example, because firebreaks are essentially bare ground devoid of vegetation they are prone to water erosion, thereby polluting nearby streams, creeks, rivers, etc. and causing other environmental damage associated with water erosion. In addition, it is not easy or quick to make a firebreak, whether it is made manually or by mechanical means, such as by a tractor. Depending upon the terrain, it may take a tractor an hour to create a ¾ of a mile firebreak. In addition to being slow, tractors and bulldozers generally are heavy pieces of equipment that are not easily transported from a central location to an area in which it is desired to build a firebreak in the path of a fire. Therefore, there is a need for an apparatus and a method for containing ground fires and for addressing these and other related problems.

SUMMARY OF THE INVENTION

Briefly described, the present invention comprises a method and an improved apparatus for cutting and chopping low to mid height vegetation, referred to as brush, and forming breaks in the brush for suppressing and containing ground fires. A ground fire can be contained and suppressed behind a strip of land in which bushes, brush, small trees, and other vegetation growing in the strip of land have been transformed from its natural state into generally particles disposed substantially flat on the ground. The brush, when cut and chopped, tends to lie low on the ground, and the low lying chopped vegetation does not lie high enough from the ground to provide air space between the cut chopped vegetation and the ground to allow a flow of air and its oxygen to support combustion of or leaping flames from the chopped vegetation. To form brush into chopped vegetation, a self propelled apparatus is guided, or driven, through the brush. As the apparatus moves forward it engages brush in its path, and the apparatus has a cutting means that cuts the engaged brush proximal to the ground. The cut brush is urged inwardly toward the center of the apparatus by the cutting means and is re-cut as the apparatus moves forward. The re-cut pieces are generally particles that are deposited on and lay substantially flat on the ground. The root system of the cut brush remains essentially undisturbed by the apparatus. The strip of land having the brush cut and chopped is for the purposes of this disclosure known as a fuelbreak. For the purposes of this disclosure, the chopped vegetation is vegetation that has been cut from the ground and re-cut into pieces that lay generally flat on the ground. The chopped vegetation is of varying size and shape depending upon both the type of vegetation and the part of the vegetation that the apparatus has chopped. Generally, as will be described in greater detail herein below, chopped pieces can be small pieces such as twigs, leaves, grasses, etc., or large pieces such as tree trunks, branches, limbs, etc. The large pieces, such as a tree trunk, are cut in such a manner that branches growing from the trunk are chopped off of the trunk so that the trunk will lie flat on the ground. Similarly, branches having smaller branches growing therefrom are cut so that the smaller branches are generally chopped therefrom so that the branch will lie flat on the ground. Thus, the fuelbreak is typically covered by chopped vegetation that includes both small and large particles.

Even though a fuelbreak is not devoid of vegetation, as a firebreak might be, a fire is easily contained by fire fighters behind a fuelbreak. Because the fuel source, the vegetation, in a fuelbreak has been cut and re-cut so that it lies substantially flat on the ground, air does not easily reach the re-cut vegetation when it is ignited. Thus, a fire might not occur in a fuel break, or when a fire reaches a fuelbreak and ignites the chopped vegetation, the fire generally is transformed from a fast moving, hot burning fire into a cooler smoldering fire that is easily extinguished by fire fighters.

A fuelbreak has advantages over firebreaks for containing ground fires. One advantage of a fuelbreak is that the roots of the cut vegetation remain substantially undisturbed during the process of making the fuelbreak. Thus, with the root system of the cut vegetation intact, a fuelbreak is not prone to water erosion because the roots stabilize the ground, thereby mitigating the harmful effects to the environment associated with a firebreak.

In addition, when a firebreak is made in soft, loose, sandy soil, such as sugar sand, the firebreak is generally impassable to subsequent vehicles. Whereas, with a fuelbreak the ground has not been plowed, or scraped, and consequently, the ground which is stabilized by the roots of the cut vegetation and covered by a layer of the cut vegetation is generally firm enough to support subsequent vehicles. The cut brush forms a blanket, or layer, of tractionable material that helps prevent a subsequent vehicle from becoming stuck in the loose sandy soil, or sugar sand. Other features and advantages of a fuelbreak will be discussed in greater detail hereinbelow.

In the preferred embodiment of the invention, the apparatus for making a fuelbreak is a ground clearing cutter which includes a rear mounted skid steer riding tractor, described in greater detail hereinbelow. The preferred apparatus is a distinct improvement over bulldozers and tractors that pull a plow for an apparatus used in containing ground fires. Frequently, a ground fire will occur in a remote region, and fire fighting equipment and personnel must be transported to the remote region to combat the ground fire. In comparison to bulldozers and tractors having a plow, the preferred apparatus is generally light weight and is easily and rapidly transported on a small truck, or a small trailer pulled by vehicle such as a pickup truck, from a central location to the remote region for deployment against the ground fire, whereas a bulldozer, for example, is normally transported on a large flat bed behind a semi-truck. Therefore, when time is of the essence, as is normally the case when fighting fires, the preferred apparatus can be deployed from a central location faster then conventional bulldozers and tractors.

Another advantage of the preferred apparatus is the speed of the apparatus. Depending upon the terrain, the preferred apparatus can generally make a 1½ mile fuelbreak in an hour, whereas, a tractor pulling a plow over the same terrain will normally make a ¾ of a mile fuelbreak in the same time. The preferred apparatus is capable of speeds greater than 1½ miles/hour and is generally twice as fast, or faster, than a tractor.

In addition to making a fuelbreak for containing a fire the preferred apparatus can be used for suppressing ground fires. Typically, it is the undergrowth vegetation or brush that initially spreads a ground fire in a woodlands area. By rendering the brush from its natural state into pieces that lay generally flat on the ground a fire is likely to be contained to a few trees. The preferred apparatus is highly maneuverable, much more so than bulldozers or tractors, so that it can be maneuvered around large trees, boulders, etc. and other obstacles found in woodlands areas. Thus, it is used for cutting and chopping the undergrowth vegetation found in woodlands areas to help prevent the occurrence of forest fires.

In the preferred embodiment, the self propelled apparatus comprises an improved ground clearing brush cutter which includes a skid steer tractor with a front mounted cutter assembly which is rigidly mounted to the tractor while being allowed to pivot with respect to the tractor about a longitudinal axis. The cutter assembly includes its own castor wheels that adjustably support the cutter assembly from the surface of the ground so as to change the height of the cutter assembly from the ground. The castor wheels are of rugged construction so as to withstand impact from trees and obstacles, which is not required by grass cutting equipment.

The cutter assembly includes a cutter deck, at least two outboard rectilinear rotary cutter blades suspended beneath the cutter deck that straddle the centerline of the cutter assembly, and a hydraulic motor for each of the cutters. Each hydraulic motor drives one of the outboard rectilinear rotary cutter blades so that the at least two outboard rectilinear rotary cutter blades are driven in opposite, counter-rotation directions. The counter rotation of the cutter blades results in the directions of movement of the blades at the front of the cutter deck moving in arcs inwardly and toward the centerline of the apparatus and then rearwardly of the apparatus. This cuts the brush in the cutting path with a motion that urges the cut brush inwardly between the blades and rearwardly beneath the cutter deck, causing the brush to be cut and re-cut as it passes beneath the cutter deck. This multiple cutting of the brush results in smaller pieces of the brush being deposited on the ground in the path of the apparatus.

The mid to large sized brush, including young trees, is pushed over by the leading portion of the cutter assembly and has the tendency to fall forwardly with respect to the implement after it has been initially cut, into the cutting path, where the brush will be overrun by the brush cutter and be re-cut. This is accomplished by placement of a leading portion of the cutter assembly forwardly of cutter blades along the cutting path. The counter direction of rotation of the blades, whereby the leading arcs of the blades rotate inwardly toward the centerline of the cutter assembly, causes the initially cut brush, etc. which is being overrun by the cutter assembly to be drawn between the blades and beneath the cutter deck where it is chopped and discharged rearwardly of the cutter assembly. Portions of the initially cut brush that extend beyond a given height from the ground are chopped off of the initially cut brush as the brush cutter advances over the initially cut brush. The chopping off of the protruding portions causes the initially cut portion to churn, or spin, thereby exposing other portions that were initially on the ground to the cutting blades so that they are then chopped off of the initially cut brush. Thus, the initially cut brush lies generally flat on the ground when the protruding portions of the brush have been cut off of the initially cut brush. Similarly, chopped off portions lying on the ground that extend beyond the given height are re-chopped by the cutting blades so that the chopped off portions lay generally flat on the ground.

The height of the cutter deck from the ground can be adjusted without disturbing the vertical position of the castor axle with respect to the axle housing. In the embodiment disclosed herein the castor wheels are mounted to a U-shaped castor shaft support, and the shaft support is, in turn, supported by an upright support or housing connected to a way mounted to the cutter deck. When the height of the cutter deck and cutter blades is to be changed, the castor shaft support or housing is adjusted with respect to the cutter deck through the adjustability of its support ways, thereby effectively adjusting the relative vertical position of the castor wheels with respect to the cutter assembly.

Because of the multiple cutting of the brush by the cutter blades beneath the cuter deck, more power is required by the cutter blades to adequately chop the brush. In the preferred embodiment of the invention, the cutter blades are each individually powered by a hydraulic motor and a short connector belt from the motor to the spindle of the cutter blade, instead of by long belt drives. This avoids belt slippage and belt wear, avoids having to arrange for a twisted belt arrangement to reverse the rotation of the outboard blades, and assures having enough power to perform proper chopping of the brush with one pass of the implement.

Thus, it is an object of this invention to provide an improved brush cutter that includes a skid steer tractor with a front mounted cutter assembly, which operates to cut and chop brush including young trees and other mid-sized vegetation, without requiring the implement to be moved over the brush a second time to achieve laying the chopped vegetation generally flat on the ground.

Another object of the present invention is to make a fuelbreak by using an improved brush cutter that cuts and chops brush and disposes the chopped brush generally on the ground.

Another object of this invention is to create a fuelbreak in which the root system of the cut brush is left substantially intact, thereby creating an environmentally benign means of containing a ground fire.

Another object of this invention is to dispose of the chopped brush on the ground substantially along the path traveled by the improved brush cutter.

Another object of this invention is to create a fuelbreak that is passable to subsequent vehicles.

Another object of this invention is to cut and chop brush in woodland areas for suppressing the occurrence of fires.

Another object of this invention is to provide an improved brush cutter for clearing land of the foliage of the brush, of the type that includes a rear mounted tractor, a front mounted cutter assembly, and with the chassis of the tractor and the cutter deck of the cutter assembly tiltably mounted to one another about a longitudinal axis, with the cutter assembly structured to engage and bend the brush in the direction of advancement of the implement along the cutting path as the base of the brush is first cut by the cutter blades, and with the cutter blades positioned and operable to overrun the initially cut brush and re-cut the brush and to urge the cut brush to move between the cutter blades and rearwardly from the cutter deck.

Another object of this invention is to provide a brush cutter that engages brush and bends it over in preparation for cutting, and after the vegetation is cut it falls in the path of the oncoming cutter therefore causing the brush to be re-cut.

Another object of the invention is to provide a brush cutter that provides for outboard blades, which rotate inwardly to draw brush toward the centerline of the cutter deck where the brush is re-cut and chopped.

Another object of the invention is to provide a brush cutter that provides for outboard blades driven by hydraulic motors, which rotate inwardly to draw the cut brush toward the centerline of the cutter deck where the cut brush is re-cut and chopped.

Other objects, features and advantages of the present invention will become apparent upon reading the following specification when taken in conjunction with the accompanying drawings.

DETAILED DESCRIPTION

Figure 1:
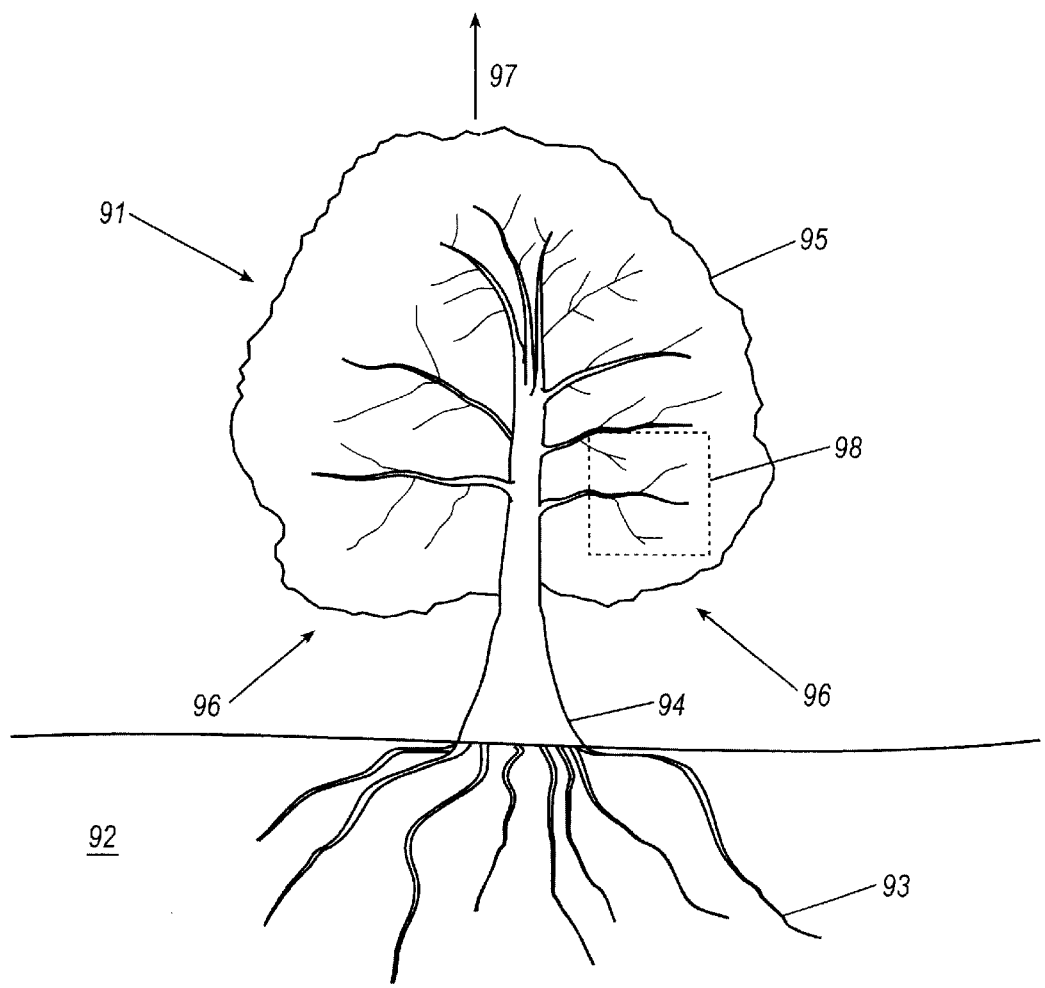
FIG. 1 is a side view of a typical bush.

Referring now in more detail to the drawings, in which like numerals indicate like parts throughout the several views, FIG. 1 illustrates a bush 91, representing typical brush growing in the ground 92. The bush 91 has a root system 93 extending generally downward and/or along the surface of the ground. Extending generally upward from the root system is a stem, stalk, or trunk of the bush, referred to herein as the base portion 94 of the vegetation. Extending generally upward and outward from the base portion is the main foliage 95 which generally includes branches, twigs, stems, leaves, etc. The base portion 94 generally supports the main foliage such that a portion of the main foliage is elevated of the ground.

The main foliage 95 generally forms an open, irregular, type of structure that is frequently impassable to humans, equipment, and other large objects, especially when there is adjacent vegetation having overlapping main foliage. However, due to the relative of openness to the foliage, air can flow relatively unimpeded through brush 91. For example, during an up draft air can flow from underneath the main foliage up through the main foliage, as indicated by arrow 96.

It is well known that hot burning fires require ample amounts of oxygen. Without any oxygen a fire is extinguished, and without a sufficient amount of oxygen a burning fire is transformed into a smoldering fire. When brush 91 is ignited by a fire, the main foliage is readily burnt, especially when the brush is dried out as is frequently the case during summer months. In its present form, brush 91 can become a hot burning fire. Due to the openness of the main foliage, there is an ample supply of oxygen in the air surrounding a burning branch, twig, leaf, etc. of the main foliage to sustain a fire. In addition, even though the main foliage is considered open and not very dense, a fire burning in one portion of the main foliage can rapidly spread to other portions of the main foliage, due to the relative close proximity of combustible materials, the branches, twigs, leaves, etc. of the main foliage.

Portion 98 of the main foliage represents a portion of the bush ignited by a ground fire. Air proximal to the flames of the burning portion provides oxygen that sustains the fire and which is heated by the flames of the fire. As the heated air rises, it creates a partial vacuum above the flames that is filled by the cool air that is pulled in along direction 96 from beneath the flames. Thus, the heated air that has been depleted of oxygen is replaced by air rich in oxygen, thereby continuing to sustain, or fan, the fire. Thus, vegetation such as bush 91 having relatively open structures burn hot when vegetation is ignited, because air rich in oxygen is drawn into the burning vegetation. If bush 91 and adjacent vegetation (not shown) are all engulfed in flames then the heat generated from the combined flames can be enough to ignite the canopy of large trees proximal to the flames. Frequently, ground fires become so hot that they create their own wind, as air is sucked into the fire. This self generated wind helps sustain the heat of the fire by providing it with an ample supply of oxygen.

Figure 2A:
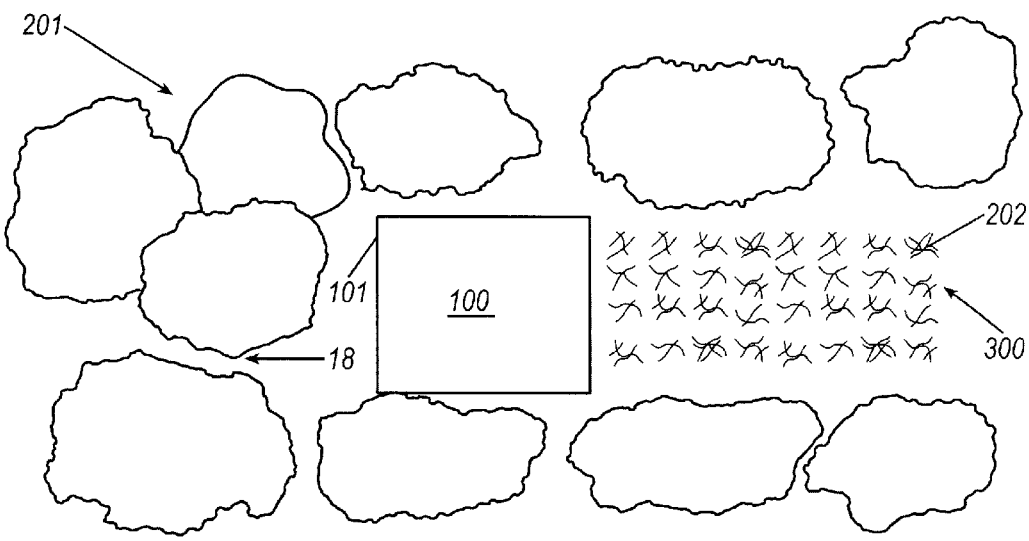
FIGS. 2A–2B are plan and elevational views, respectively, of an apparatus making a fuelbreak through brush, respectively.

Referring now to FIG. 2A, shown is a view from above of a self propelled apparatus 100 that is driven, or guided in a direction 18 through brush 201. As apparatus 100 moves forward along the direction indicated by arrow 18, it engages the brush at its front end 101, and cuts the base portion of the engaged brush proximal to the ground. The cut brush is urged beneath the apparatus 100 where it is re-cut and chopped as the apparatus moves forward. In one implementation of the invention, the front end is adapted to engage the brush and bend it over in the direction of movement of apparatus 100. A preferred embodiment of the apparatus having a cutting means and an engaging means will be discussed in greater detail hereinbelow.

As apparatus 100 moves forward it leaves in its wake a fuelbreak 300 having brush that has been rendered from its natural state into generally smaller pieces 202 that lay generally flat on the ground.

Figure 2B:
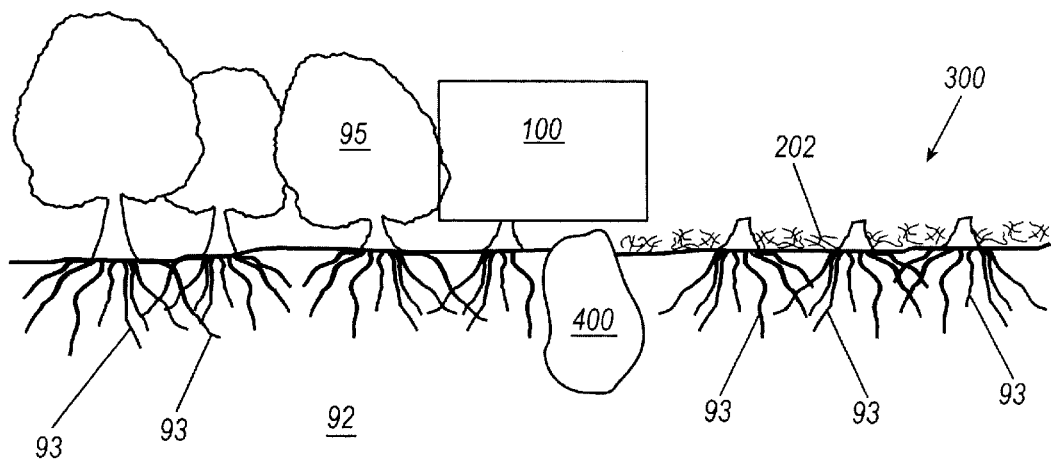

Referring now to FIG. 2B, shown is a side view of apparatus 100 making fuelbreak 300. The front end 101 of apparatus 100 engages brush proximal to the front end and tilts it in direction 18. The root systems 93 of the cut brush remains essentially undisturbed by apparatus 100 as it cuts and re-cuts the main foliage 95. Even though the cut brush 202 is not removed from the pathway traveled by apparatus 100, the cut brush is not highly combustible. The cut brush is cut and chopped by apparatus 100 so that the brush is rendered into pieces that generally lay in a random layered fashion substantially on the ground. If the cut brush were ignited, typically the pieces of brush would smolder, instead of flaring up into flames. The ignited pieces of cut brush tend to smolder because they do not receive enough oxygen to fully burn; air cannot feed the fire from underneath, because the pieces of cut brush are lying on the ground or close to the ground when lying on top of another layer of cut brush. In either case, air does not flow upwardly fast enough to feed the smoldering brush into a large flame, and consequently, a fuelbreak transforms a fast moving hot fire, into a smoldering, cooler, slow moving fire which is easily extinguished by ground crews.

The fuelbreak 300 produced by apparatus 100 forms a pathway through the brush 201. The ground 92 and the root systems 93 of the cut brush of the fuelbreak remains substantially undisturbed by apparatus 100. Thus, the roots help to stabilize the ground, thereby helping to prevent water erosion. Consequently, fuelbreaks can be permanently maintained without harming the environment. In addition, when apparatus 100 is used in loose sandy soil, such as sugar sand, the root systems of the cut vegetation helps to stabilize the ground so that subsequent vehicles can follow apparatus 100 without becoming stuck in the loose ground. Thus, apparatus 100 can provide a means for clearing a pathway through the brush for fire fighting and other equipment. Furthermore, the cut pieces of brush 202 essentially form a layer, or a blanket, of tractionable material over the ground. This layer of cut brush further helps support vehicles that travel along the fuelbreak created by apparatus 100.

In addition, the preferred embodiment of the apparatus can be used to make a fuelbreak in an area that would be impossible, or extremely difficult to make firebreak. The height of the cutting means of the preferred apparatus can be adjusted vertically so the cutting means can clear partially buried rocks and boulders. In FIG. 2B, partially buried boulder 400 is too large for a bulldozer to move, whereas the cutting means of the preferred apparatus may be adjusted upwardly to pass over it. Thus, in a region having many partially buried boulders, a bulldozer would not be able to create a firebreak and neither would a tractor pulling a plow. In addition, plows can not generally be used in areas where there are large roots or other objects that would impede the plow. Thus, the preferred apparatus can make a fuelbreak in areas that have partially buried roots and/or partially buried boulders that would prevent tractors and bulldozers from creating a firebreak.

Figure 3:
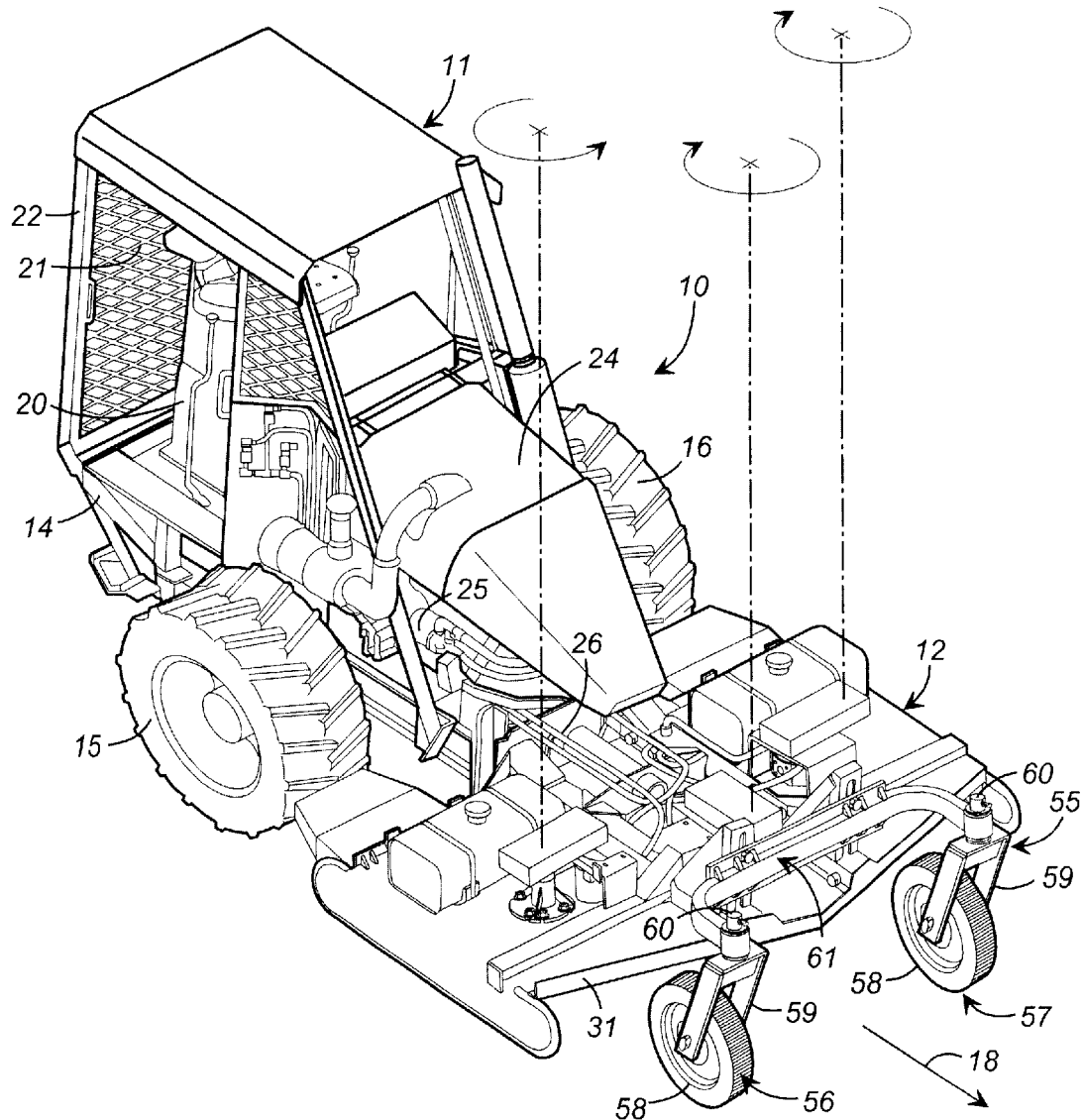
FIG. 3 is a perspective illustration of the preferred embodiment of the cutter assembly, with direction arrows indicating the direction of rotation of the cutter blades.

FIG. 3 illustrates in perspective the preferred embodiment of the ground clearing brush cutter 10 which includes a rear mounted skid steer riding tractor 11 and a front mounted cutter assembly 12. The tractor 11 includes a chassis 14, and a pair of side mounted driving wheels 15 and 16 that straddle the chassis of the tractor. The tractor 11 includes a driver's seat 20, and driver's cage 21 with roll bar structure 22. The tractor wheels 15 and 16 are individually controlled in the conventional manner, so as to guide the tractor in a conventional skid-steer arrangement. The engine which powers the driving wheels 15 and 16 is located beneath the engine hood 24 and the engine and side mounted wheels 15 and 16 and associated components function as a power means for advancing the tractor 11 and cutter assembly 12 in a forward direction along the cutting path 18. A hydraulic pump 25 is driven by the engine, and its hoses 26 and 27 are connected to the hydraulic motors (to be described later) that are mounted on the cutter assembly 12 and which rotate the cutter blades. The brush cutter 10 is capable of clearing and chopping vegetation on an incline of approximately 30 degrees and in static tests the tip over angle is approximately 50 degrees. This enables the brush cutter to operate in areas that could cause a bulldozer, or other tracked vehicle, to slip a track. In addition, the brush cutter is a relatively light weight apparatus, generally less than 7,000 lbs. The relative light weight of the brush cutter enables the brush cutter to traverse terrain without tearing up the top soil and the root systems of the cut vegetation, and it enables the brush cutter to be easily transported on a small trailer.

Figure 4:
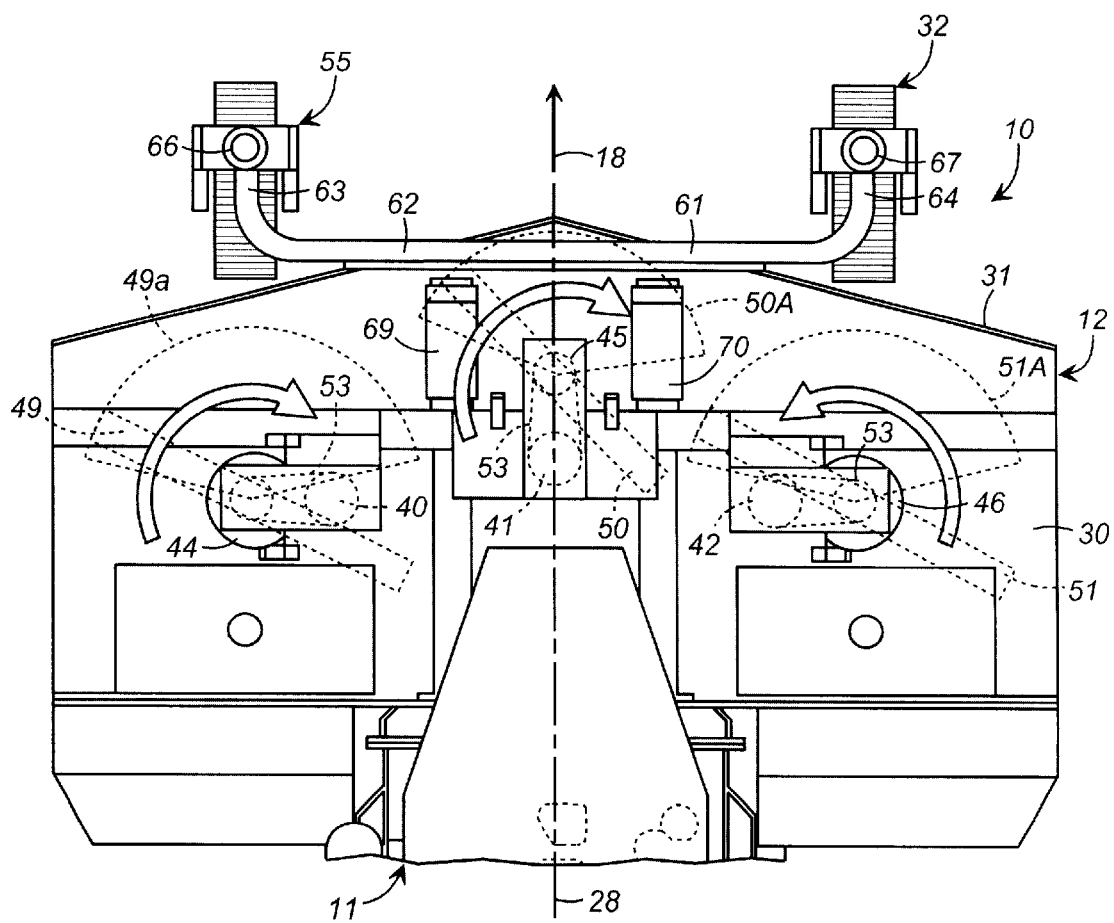
FIG. 4 is a top view of the cutter assembly, showing the direction or rotation of the cutter blades.

As illustrated in FIG. 4, the tractor 11 and cutter assembly 12 define a longitudinal, upwardly extending plane 28, which includes the longitudinal axis of the tractor and cutter assembly which is also indicated by arrow 18, and several of the operative elements of the brush cutter 10 are duplicated on opposite sides of the longitudinal plane 28.

Cutter assembly 12 includes a cutter deck 30 that supports the components of the cutter assembly and an upwardly turned brush pusher skirt 31 positioned at the forward edge of the deck, and castor wheel assembly 32 is mounted to the forward portion of the cutter deck for supporting the cutter assembly from the ground surface beneath the cutter assembly.

Figure 5:
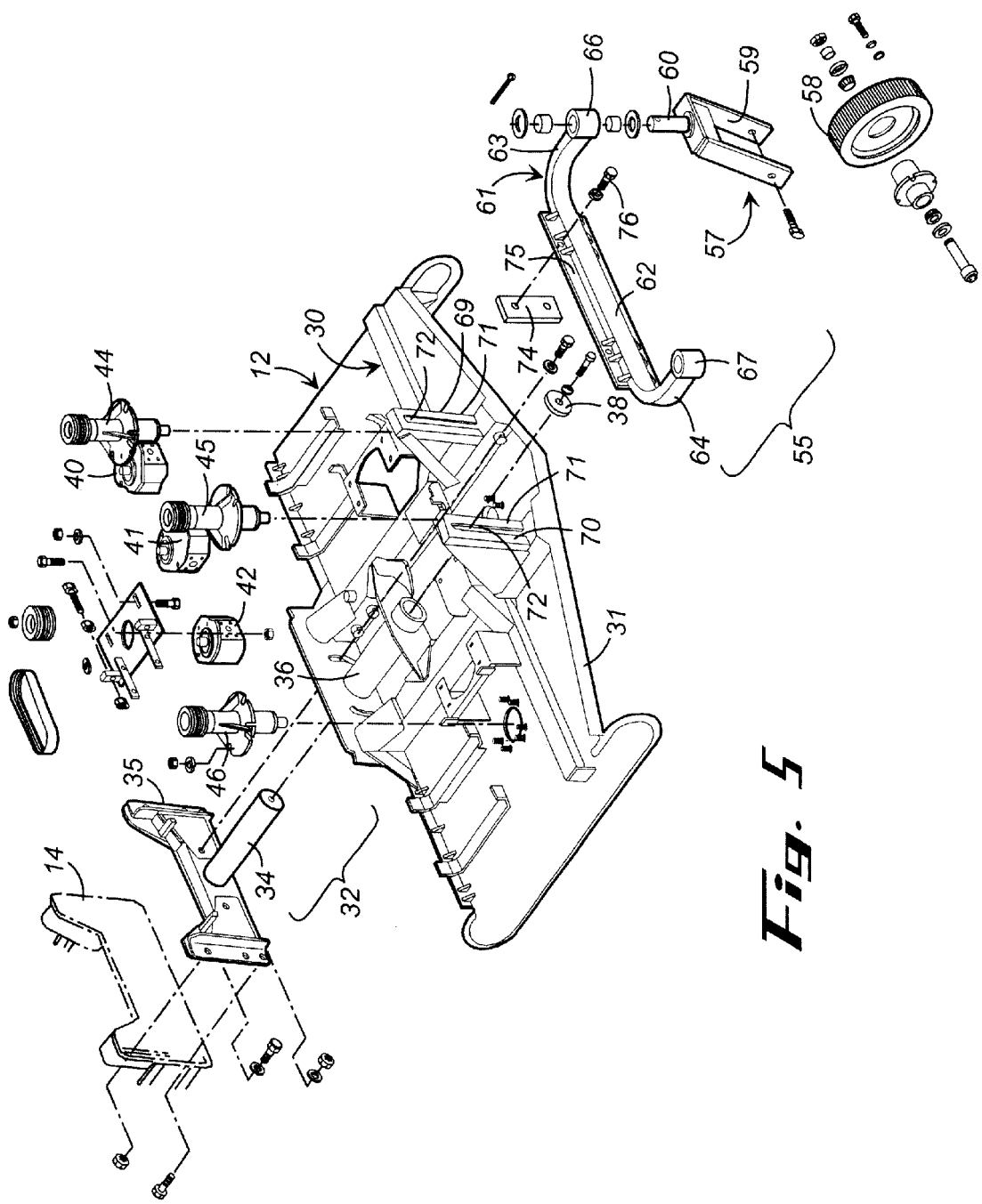
FIG. 5 is an exploded perspective illustration of the cutter assembly.

As illustrated in FIG. 5, a pivot connector 32 connects the cutter assembly 12 to the chassis 14 of the tractor and includes cylindrical pivot bar 34 that is mounted at one of its ends to the mounting plate assembly 35 which is, in turn, mounted by bolts to the chassis 14. The pivot bar 34 has its axis parallel to the longitudinal plane 28 (FIG. 4). Pivot tube 36 is rigidly mounted to the cutter deck 30 and is telescopically mounted about pivot bar 34 of the tractor. Retaining washer 38 and its screws hold the pivot bar in the pivot tube 36 so that the cutter assembly 12 is tiltably mounted to the tractor 11.

As illustrated in FIG. 5, hydraulic motors 40, 41 and 42 are mounted to cutter deck 30 and are connected by the hydraulic lines 26 and 27 to the pump 25 of tractor 11. The motors 40–42 are connected by drive belts (not shown) to cutter blade mandrel assemblies 44, 45, and 46, respectively, all of which are mounted to the cutter deck 30. Rectilinear cutter blades 49, 50 and 51 (FIG. 4) are positioned beneath the cutter deck 30 and are mounted to the cutter blade mandrel assemblies 44–46. The motors 40–42 are reversible hydraulic motors, in that the directions of rotation of the cutter blades can be reversed by reversing the direction of the hydraulic flow through the motors. Usually it is desirable to have the cutter blades sharpened on its opposite edges of each end to cut in either direction of rotation. This allows any blade to be mounted on any cutter deck.

FIGS. 3 and 4 illustrate the rectilinear cutter blades 49–51 being rotated so that the outboard cutter blades 49 and 51 are being rotated in directions such that their leading arc of rotation that faces in the direction of the cutting path 18 move toward the longitudinal cutting plane 28, thereby urging the brush being cut by the blades 49 and 51 to move to the center of the cutter assembly 12.

It will be noted that each hydraulic motor drives a given mandrel assembly, and that a given motor can be reversed by interchanging the hydraulic hoses 26 and 27 (FIG. 3) attached to the given motor, thereby reversing the rotational direction of the driven mandrel and its cutter blade. The motors are each connected by a short length drive belt to the mandrel of a cutter blade. The use of a motor for each mandrel and blade avoids having to use multiple belt drives extending from a single motor to two blades and the twisting of one of the drive belt in order to rotate the blades in counter rotating directions. Twisting a belt to achieve counter rotation usually causes the belt to over heat and the belt usually is looser and tends to slip on its mandrel. A consequence of a belt being loose is that power is lost when driving the mandrel. Thus, by having a hydraulic motor for each mandrel, the rotational direction of each mandrel is independent of the other mandrels and no power is lost from having loose belts driving the mandrels. Enough power is provided to the rectilinear cutting blades 19–21 by each motor that the blades are capable of cutting small trees having approximate diameters of up to 4 inches.

It will be noted that the blades 49, 50 and 51 are elongated, double end, single piece rectilinear blades, as opposed to the blades that are sometimes used with brush cutters, which have a large central disk with small cutting elements attached to the periphery of the disks. The prior art cutters with the large central disks operate to cut and urge the cut brush generally at a tangent with respect to the disks, which has the tendency of retarding the movement of the cut brush between adjacent ones of the blades. However, in the invention herein disclosed, the use of the relatively thin, rectilinear blades 49, 50 and 51 provides room for the cut brush to be moved between adjacent ones of the counter rotating blades, such as between blades 50 and 51, where the cut brush can be re-cut as it passes between the blades, and the cut brush usually is urged rearwardly beneath the cutter deck 30, to be passed over by the following tractor 11.

Although the rectilinear blades 49, 50 and 51 are illustrated as one piece blades, it should be understood that multiple part blades can be used, or blades of other configurations can be used as long as the cut brush can be effectively chopped as it passes between the blades and under the cutting deck.

As illustrated in FIG. 4, the outboard cutter blades 49 and 51 have their cutting paths overlap middle cutter blade 50 so that there will be no uncut gap left in the vegetation of the cutting path.

While three cutter blades 49, 50 and 51 have been illustrated in the embodiment disclosed herein, the ground clearing brush cutter 10 can be constructed with other combinations of blades, such as two blades, four blades, or even more blades. The use of three blades takes advantage of the staggered relationship of blades so as to avoid gaps in the cutting swath formed in the vegetation, and the use of at least two blades takes advantage of the ability of the outboard blades to rotate so that their leading arcs move toward the longitudinal plane 28, tending to urge the cut brush inwardly beneath the cutter deck where there is a reasonable likelihood that the brush will be re-cut and therefore chopped as it is passed rearwardly between the outboard blades and the middle blade.

As previously stated, the hydraulic motors 40, 41 and 42 are reversible, so that the outboard cutter blades 49 and 51 can rotate in the direction opposite to that illustrated in FIGS. 3 and 4, so that the brush being cut by the outboard blades is urged laterally, out to the side of the cutter assembly 12, so as to avoid re-cutting or chopping of the brush. The cutter blades are double edged in that they have sharpened edges on both the leading and trailing peripheral edges, so that they can be operated in either direction for cutting purposes. When the brush cutter is being operated in this manner, less energy is required to cut the brush since there is little re-cutting of the brush that takes place. Further, it is usually possible to advance the brush cutter at a higher velocity through the field if the brush is being cut only once and is urged laterally away from the cutter assembly.

As illustrated in FIGS. 3 and 5, the cutter assembly 12 is supported at its forward edge by castor wheel assembly 55. Castor wheel assembly 55 includes a pair of castor wheel units 56 and 57 which straddle the longitudinal plane 28 and engage the ground surface and support the cutter assembly 12. Each castor wheel unit 56 and 57 includes a wheel 58 having a wheel housing 59, and an upwardly extending pivot shaft 60. A U-shaped castor support 61 includes a base leg 62 and a pair of parallel end legs 63 and 64 mounted at the ends of base leg 62, with the end legs extending in the forward direction of movement of the brush cutter 10. Castor housings 66 and 67 are formed at the distal ends of the end legs 63 and 64 and pivotally support the shafts 60 of the castor wheel assemblies FIG. 5 also provides an illustration of the spaced support struts 69 and 70 for supporting castor housings 66 and 67. The support struts 69 and 70 also provide for vertical adjustment of the height of base leg 62 to which the castor housings 66 and 67 are fixed. In other applications the support struts 69 and 70 would connect directly at the castor housings 66 and 67 and eliminate the base leg 62.

As best illustrated in FIG. 5, the pair of spaced support struts 69 and 70 are rigidly mounted to the upper surface of cutter deck 30 and function as mounting means to support the U-shaped castor support 61. Each strut 69 and 70 includes a vertical way 71 that defines a vertical slot 72. A holding plate 74 is placed behind the way 71, and a mounting bracket 75 which is rigidly attached to the base leg 62 of the U-shaped castor support 61 is applied in flat, facing contact with each way 71, and a bolt 76 extends through aligned openings of the mounting bracket 75, way 71, and then through the holding plate 74. This slidably attaches the castor wheel assembly 55 to the cutter deck 30. Once the desired height of the cutter deck has been achieved, the bolts 76 are tightened to rigidly connect the castor wheel assembly 55 to the cutter deck.

Should it be desired to change the height of the cutter deck from the ground, the bolts 76 of the castor wheel assembly 55 can be loosened and the castor wheel assembly slid upwardly or downwardly with respect to its ways 71, and the bolts re-tightened to establish the new height. This may be important in situations where the brush cutter is to be used in a field where larger than normal brush is to be cleared, particularly when young trees are to be cut and it is desirable to cut higher from the ground surface. In addition, it may be important to raise the deck from the ground when the brush cutter is being used in an area that has objects such as rocks protruding from the ground that could damage the cutting blades. Also, the reverse adjustment of the cutter height may be desired when the field to be cut bears smaller brush.

It will be noted from FIG. 4 that the cutter blades 49, 50 and 51 are constructed and arranged so that substantially their entire forward facing cutting arcs 49A, 50A and 51A are located beneath the cutter deck 30. The upwardly turned brush pusher skirt 31 of the cutter deck is at a height above the cutter blades and the ground so that it usually engages the brush before the cutter blades 49–51 engage and cut the brush. The skirt 31 therefore functions as brush engaging means for bending the brush over in the direction of movement of the brush cutter 10. Other forms and shapes of the skirt 31 can be used for this function. When the blades first cut the brush, the brush, being bent over in the direction of movement of the brush cutter tends to fall to the ground in the cutting path of the brush cutter, so that the cutter assembly 12 will pass over the cut brush. As the cutter assembly passes over the cut brush, it re-cuts the brush and generally urges the brush in the directions as indicated by the arrows of FIG. 4, so that the outboard cutter blades 49 and 51 urge the brush toward the longitudinal plane 28 of the brush cutter. This causes the brush to be urged toward an adjacent cutter blade where the brush will be re-cut and chopped. The use of rectilinear cutter blades provides space in the arcs of movement of the cutter blades, so that the brush that is being cut and re-cut has space to move adjacent the cutter blades and between adjacent ones of the cutter blades, allowing the re-cut brush to be urged rearwardly between the blades to exit at the rear of the cutter assembly 12.

In addition to the skirt 31 of the cutter deck engaging and bending over the brush toward the cutting path, the U-shaped castor support 61 of the castor wheel assembly 55 is positioned so it will function as a brush engaging means to engage the larger vegetation and bend it toward the direction of movement of the cutter assembly before and after the cutter blades cut the vegetation. Also, the U-shaped castor support 61 helps to keep tall vegetation from falling onto the cutter deck 30.

Figure 6A:
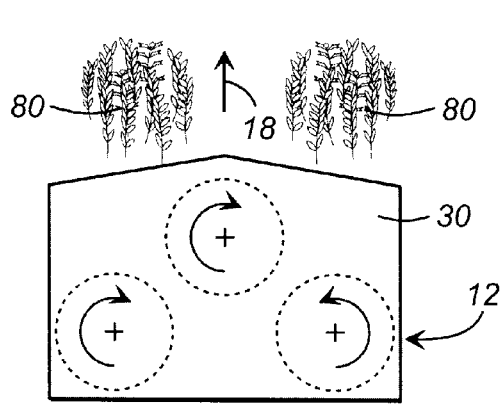
FIGS. 6A–6D are progressive schematic illustrations of the cutter assembly, showing how the blades rotate to urge the brush to be moved under the cutter assembly where it is re-cut into smaller particles and discharged rearwardly of the cutter assembly.
Figure 6B:
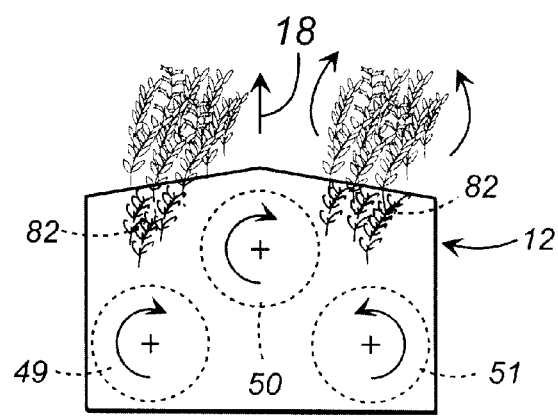
Figure 6C:
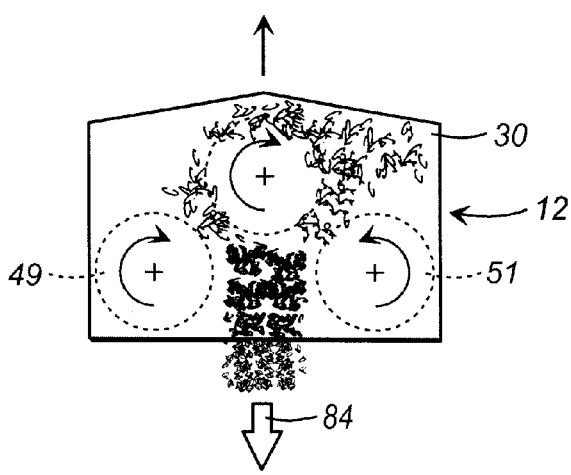
Figure 6D:
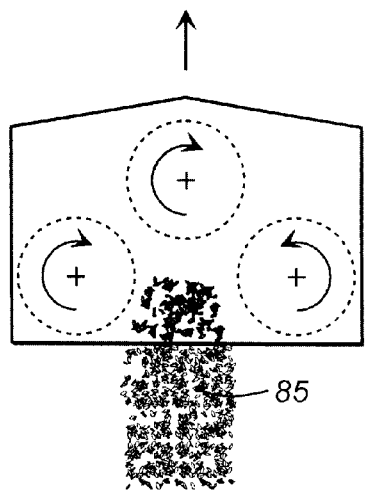

As illustrated in FIGS. 6A and 6B, the cutter deck 30 tends to move into engagement with brush 80 and 81 and tends to tilt the brush (FIG. 6B) in the direction of movement as indicated by arrow 18, where the stems 82 of the brush are first cut by the cutter blades 49, 50 and 51. Amount of tilting of the brush depends upon factors such as the height that the cutter deck from the ground and which portion of the cutter deck engages the brush. However, the brush is bent approximately between 10°–40° with the smaller angle being closer to the centerline of the brush cutter. After the brush has been cut from the ground, it falls to the ground in the path 18 and the cutter assembly moves over the fallen brush and re-cuts the brush (FIG. 6C). The outboard cutter blades 49 and 51 urge the brush toward the longitudinal center line (FIG. 6C), where the brush is urged rearwardly beneath the cutter deck 30 and discharged as indicated by direction arrow 84. As illustrated in FIG. 6D, the cut brush 85, having been cut and re-cut, falls to the ground and lies in the cutting path behind the brush cutter.

In one embodiment of the current invention, the cutter blades rotate at approximately 2,000 rpm, and thus, the double end rectilinear cutter blades strike, or cut, the brush 4,000 times per minute. The high rpm's of the cutter blades help enable the chopping of small trees, brush, and other vegetation into pieces that lay substantially flat on the ground. For example, in the case of a small tree, approximately 4 inches in diameter, when the brush cutter advances on the small tree the cutter deck bends the tree over in the direction of movement of the brush cutter, whereupon the trunk of the tree is cut by a rotating blade. Because the tree, and other brush extending above the height of the cutter deck, has been bent over in the forward direction of the brush cutter, the cut tree falls in the path of the brush cutter. As the brush cutter runs over the fallen tree, and other vegetation, the rotating blades engage branches, limbs, etc. that extend generally upward from the trunk of the tree, and the rotation of the blades urge the tree towards the centerline of the brush cutter, and the upward extending branches are chopped off of the tree trunk. Because of the high rpm's of the cutting blades the tree's trunk is churned, or spun, as the limbs are chopped off. The spinning of the tree causes other branches, limbs, etc. that were extending generally downward to be exposed to the rotating cutter blades, and consequently, to be chopped off of the tree's trunk. The chopped off branches, limbs, etc. are also urged toward the centerline of the brush cutter where they are re-cut by the rotating blades. As the brush cutter advances, the chopped off branches, limbs, etc. are either between the rotating blades and the ground, or between the rotating blades and the cutter deck. Either way, the chopped off branches, limbs, etc. are re-cut until they are no longer in contact with the rotating blades. Thus, the "fluff", the small branches, twigs, leaves, etc. are cut from the branches, limbs, etc. so that the branches, limbs, etc. lay generally flat on the ground. Thus, the tree has been rendered into smaller pieces that lay generally flat on the ground, and the chopped pieces tend to smolder when ignited because not enough oxygen readily reaches the ignited chopped pieces for full burning.

In the preferred embodiment, the center cutter blade 50 works in cooperation with the outboard cutter blades 49 and 51 to cut and chop the vegetation so that the chopped vegetation lays generally flat on the ground. The outboard cutter blades 49 and 51 are staggered behind the center cutter blade so that there is no gap in the cutting swath. The center cutter blade helps urge cut vegetation under the cutter deck where together the three cutter blades chop the vegetation into smaller pieces that lay generally flat on the ground.

Figure 7A:
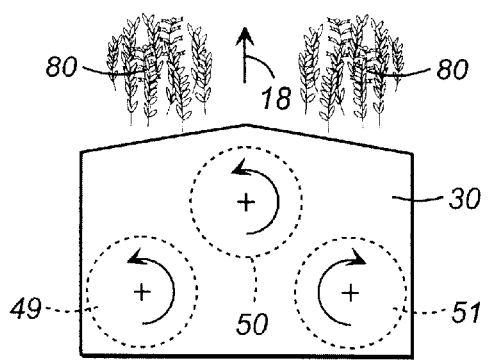
FIGS. 7A–7D are progressive schematic illustrations, similar to FIGS. 6A–6D, but showing the cutter blades rotating in a reverse direction, whereby the brush is cut and expelled to the outside of the cutter assembly for rapid cutting, not chopping.
Figure 7B:
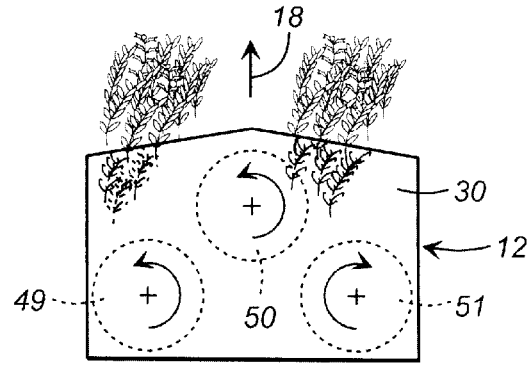
Figure 7C:
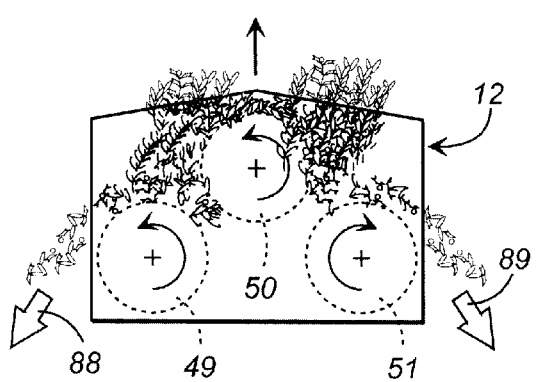
Figure 7D:
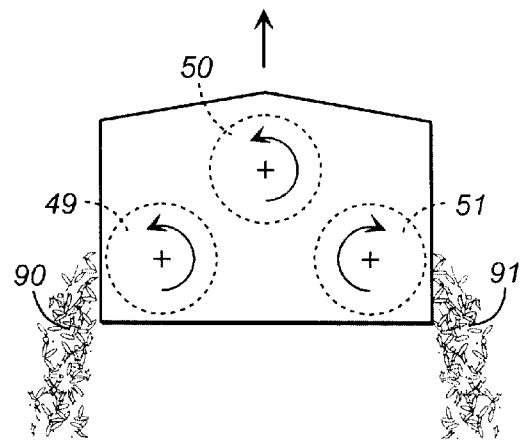

When the motors 40, 41 and 42 of the brush cutter are reversed, thereby reversing the direction of rotation of the cutter blades 49, 50 and 51, as indicated in FIGS. 7A–7D, the cutter deck 30 again bends the brush 80 over into the path 18 of the brush cutter (FIG. 7B) and cuts the brush at its base, whereupon the brush falls to the ground in front of the brush cutter. When the cutter assembly 12 passes over the fallen brush, it cuts the brush and moves it laterally, as indicated by direction arrows 88 and 89. This forms the brush into trails 90 and 91, as indicated in FIG. 7D, with the brush having been only minimally re-cut and substantially not chopped. This provides for rapid cutting but not chopping. With the leading arcs of the cutter blades 49 and 51 rotating outwardly, chopping is reduced and the material is no longer congested under the cutter deck 30 while being chopped. Moving the material to the outside reduces the power required for cutting and eliminating the power required for chopping thereby allowing the machine to cut substantially faster.

While the foregoing description discloses a preferred embodiment of the invention, it will be understood by those skilled in -the art that variations and modifications thereof can be made without departing from the spirit and scope of the invention as set forth in the following claims.

I claim:

1. A process for making a fuelbreak in a forest having brush growing from a ground surface to contain and suppress ground fires in the brush growing from the ground surface, the brush having root systems extending generally beneath the ground surface and upper portions extending above the ground surface, said process comprising the steps of:

advancing a cutter along a cutting path;

engaging and bending with the cutter the upper portion of the brush in direction of advancement of the cutter;

cutting with the cutter a path through the brush at a position proximal to the ground surface where the brush is bent substantially without disturbing the root systems of the brush to remove the upper portions of the brush from the root systems;

depositing the cut upper portions of the brush in front of the cutter;

over running the cut upper portions of the brush with the cutter;

chopping with then cutter the cut upper portions of the brush and rendering the cut upper portions of the brush in the cutting path, into generally smaller particles configured to lie substantially flat on the ground surface; and depositing the chopped brush in the cutting path on the ground surface.

2. The process of claim 1, wherein the step of;

chopping the cut upper portions of the brush comprises re-cutting the cut brush; and wherein the step of depositing the chopped brush in the cutting path on the ground comprises depositing the smaller particles substantially on and proximal to the ground.

3. The process of claim 2, wherein the step of cutting a path through the brush comprises gathering the brush toward the center of the path and in front of the cutter as the path through the brush is being cut.

4. The process of claim 3, wherein the step of cutting a path through the brush comprises propelling a cutting and chopping apparatus along the path and through the brush.

5. The process of claim 4, wherein the step of depositing the chopped brush in the cutting path on the ground surface comprises covering the ground with the generally smaller particles of brush for forming a surface of chopped brush in the path for a vehicle to pass over the brush.

6. The process of claim 5, whereby in the event of a fire at the path, suppressing a ground fire in the path with the chopped brush, whereby said smaller particles laid flat to the ground tend to smolder when ignited.

7. The process of claim 1, and further including stabilizing the ground with the root systems of the cut brush for preventing vehicles traveling on the path from becoming stuck in the ground.

8. The process of claim 7, wherein the step of stabilizing the ground with the root systems of the cut brush comprises forming a blanket of chopped brush on the path for supporting a vehicle on the path for preventing a vehicle from becoming stuck in the path.

9. The process of claim 1, and further including stabilizing the ground with the root systems of the cut brush for preventing water erosion.

10. A method of containing and suppressing a ground fire in brush growing from a ground surface and having root systems extending generally beneath the ground surface and upper portions above the ground surface by cutting and chopping the brush growing from the ground surface, comprising the steps of:

advancing a tractor with a front pivotally mounted cutter assembly over the ground surface along a cutting path, with the cutter assembly including a cutter deck having a longitudinal centerline and a pair of cutter blades suspended beneath the cutter deck on opposite sides of the longitudinal centerline;

engaging the brush in the cutting path with the cutter assembly;

bending the brush with the cutter assembly in the direction of movement of the cutter assembly away from the cutter assembly;

rotating the pair of cutter blades in counter directions of rotation beneath the cutter deck with the leading edges of each cutter blade moving toward the longitudinal centerline;

cutting the brush while the brush is bent away from the cutter assembly at a position proximal the ground surface with the counter rotating blades that move in an arc toward the centerline of the cutter assembly;

urging the cut brush with the cutter blades to fall in the cutting path ahead of the cutter assembly;

advancing the cutter assembly over the cut brush in the cutting path;

re-cutting the brush beneath the cutter assembly with the cutting blades of the cutter assembly;

urging with the cutter blades the re-cut brush rearwardly substantially parallel to the longitudinal centerline and beneath the tractor; and depositing the cut brush on the ground surface in the path behind the cutter deck with the cut brush lying generally flat on the ground surface.

11. A process for making a fuelbreak in a forest having brush growing from a ground surface to contain and the suppress ground fires, the brush having root systems extending generally beneath the ground surface and an upper portion above the ground surface, said process comprising the steps of:

advancing a self propelled apparatus having a cutter deck with a longitudinal centerline over the ground surface through the brush, engaging and bending with the self propelled apparatus the upper portions of the brush in the direction of advancement of the self propelled apparatus;

rotating a pair of cutter blades beneath the cutter deck about upright axes with the arcs of the cutter blades in the direction of advancement of the cutter deck rotating inwardly toward the longitudinal centerline of the cutter deck;

as the cutter deck advances over the ground surface cutting with the pair of cutter blades a path through the brush engaged and bent by the self propelled apparatus at a position proximal to the ground surface substantially without disturbing the root systems of the brush and removing the upper portions of the brush from the root systems of the brush and urging the cut upper portions of the brush to fall in front of the cutter deck;

moving the cutter deck over the cut brush in the path of the cutter deck;

chopping the upper portions of the cut brush with the cutter blades beneath the cutter deck into sizes that lie substantially flat on the ground surface;

depositing the chopped brush in the path on the ground surface behind the cutter deck with the cut brush lying generally flat on the ground surface.

* * * * *